Feb. 12, 1935.  L. W. SYKES  1,990,622
INTERNAL COMBUSTION ENGINE FUEL COMPENSATOR
Filed Aug. 2, 1933
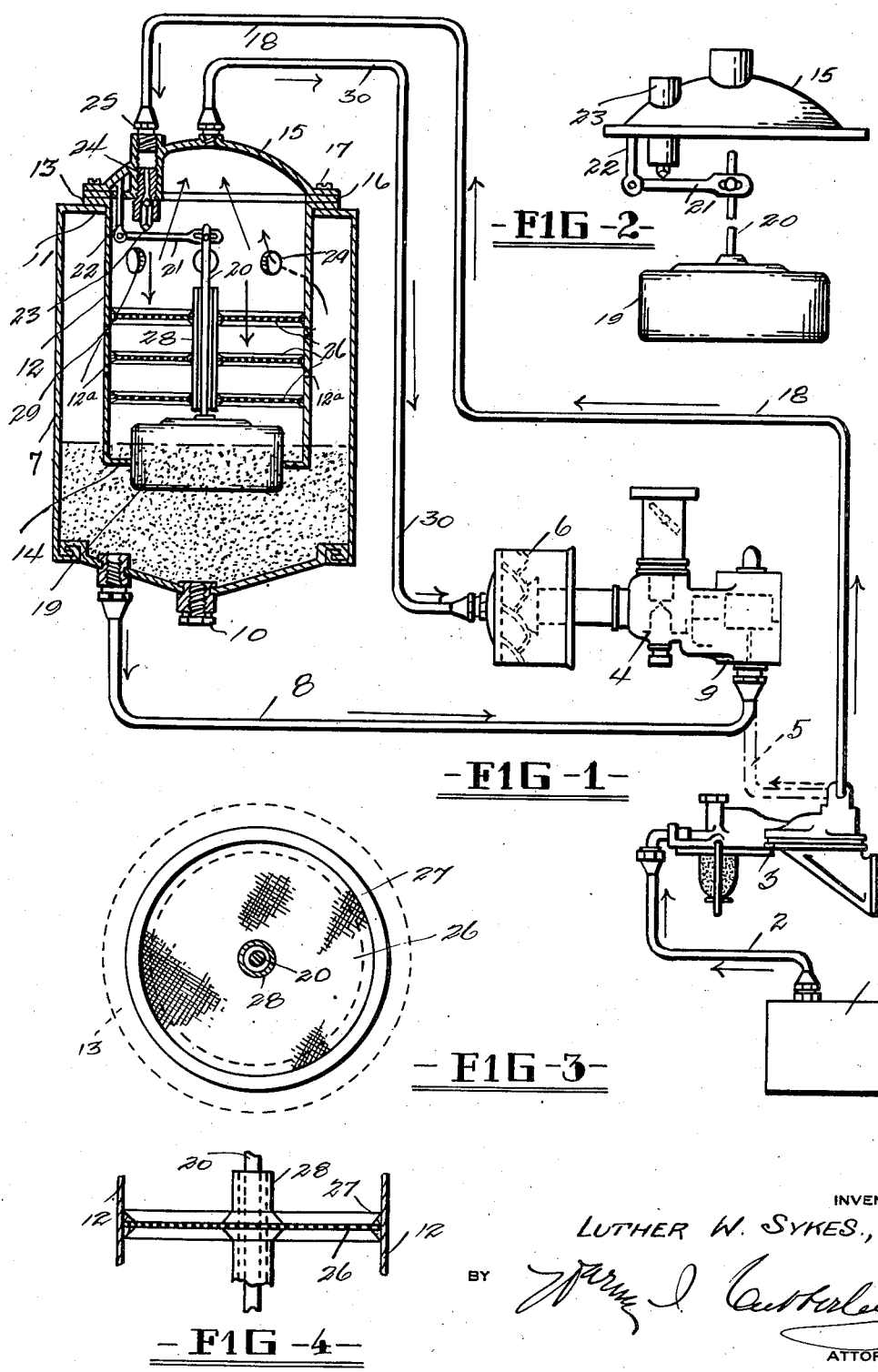
INVENTOR
LUTHER W. SYKES.,
BY
ATTORNEY Patented Feb. 12, 1935

1,990,622

UNITED STATES PATENT OFFICE 1,990,622

INTERNAL COMBUSTION ENGINE FUEL COMPENSATOR

Luther W. Sykes, Denver, Colo.

Application August 2, 1933, Serial No. 683,371

10 Claims. (Cl. 123—119)

My present invention, in its broad aspect, has to do with improvements in means for maintaining at all times and under substantially all conditions the most efficient fueling of internal combustion engines, and more particularly my invention is adapted for use in its present form in conjunction with the power plant of any conventional motor vehicle, although by so specifically describing it herein I desire to emphasize that it may be used with stationary engines, or any other type of internal combustion engine as well.

Among the principal advantages of my invention may be briefly defined the following; (1) my device eliminates what is commonly termed "vapor lock" in the fuel line of a power plant assembly; (2) the fuel temperature as delivered to the carburetor is reduced when under high temperature operating conditions; (3) there is provided means for relieving pressure built up at any point when the fuel is confined in the fueling system of the power plant under conditions inducing expansion of the air and vapor due to heat; (4) the burden placed upon the ordinary carburetor float valve of offering back pressure to the pump for controlling the fuel feed to the carburetor is eliminated; (5) recognizing that the ideal condition is a maintainance of a balanced adjustment between carburetor and fuel pump at all times under variable pressures caused by the variable engine speeds, and that the maintainance of this condition is at present impractical due to the mechanical isolation of the carburetor from the fuel pump; I provide means for eliminating the necessity or desirability of maintaining a balanced adjustment between the carburetor and fuel pump, while at the same time accomplishing the advantages of such an adjustment; (6) I provide means for preventing the fuel pump from overfeeding or "crowding" the carburetor; (7) there is also provided means for separating the vapor or "dry gas" from aerated liquid fuel, and for utilizing the "dry gas" for combustion purposes, and at the same time permitting the carburetor to atomize the solid liquid in the conventional way; (8) in my invention the high octane fuel content is compensated for to the end that the proper functioning of the carburetor is not disturbed when so called "high test" gasolene is used under heat; (9) to eliminate difficulties in proper carburetion when gasolene is near the boiling point due to its passage through hot conductors; (10) to provide for an adequate capacity of fuel under gravity feed conditions to the carburetor under all speed conditions, in a fueling system utilizing a pump for delivering fuel from the storage tank, and; (11) to greatly reduce the consumption of fuel by the power plant without lowering its efficiency, in other words to increase the fuel efficiency.

Other and equally important advantages of my compensator will be apparent as the description of the parts thereof proceeds, and other marked advantages are to be attributed to my invention in addition to those cited briefly in the foregoing; interpretation of the scope of my invention is to be made only with reference to the appended claims, and changes in structure may be made provided they fall within the scope of the inventive concept expressed therein.

In the drawing wherein I have shown a form of my invention:—

Figure 1 is an assembly view of the several parts thereof, with the supplementary fuel chamber or tank shown in section to reveal the operating parts contained therein;

Figure 2 is a view of the float and check valve assembly;

Figure 3 is a top plan view of a screen section, and

Figure 4 is a side elevation of a screen section.

In the drawing wherein like characters of reference are used to designate like or similar parts throughout the several views:—

The numeral (1) designates the gasolene storage tank of a conventional motor vehicle; (2) the gas line from the storage tank to the pump (3), and the conventional gas line from the pump (3) to the conventional carburetor (4) is shown in dot-and-dash lines at (5) and usually the conventional gas line connection (5) may be retained (but preferably cut out) in the event it is desired to resort to the usual fuel system in the operation of the car. Communicating in the usual manner with the carburetor is the air cleaner (6). All of the above parts are conventional and form no part of my present invention except as elements in the combination.

My compensator comprises a receptacle or tank (7) located adjacent the power plant (not shown) and in such position that the gravity feed line (8) to the carburetor bowl (9) will function to supply liquid fuel to the carburetor. The tank (7) has a drain plug (10) and has an open top formed with a relatively broad internal annular flange (11) on which is seated a smaller cylindrical shell or casing (12). The shell or casing (12) has an upper external annular flange (13) resting on the flange (11) and supporting the shell within the receptacle in the manner shown in Figure 1. The bottom of the shell or casing is open and has an internal annular flange (14). Over the top of the shell or casing (12) is a curved dome or cover (15), and between the edges of the dome and the flange (13) is a packing member or gasket (16). There are bolts or other securing means (17) extending through the edge of the dome or cover, through the gasket, and through flanges (13) and (11) to hold the parts in assembly.

The receptacle or tank (7) is ordinarily filled with gasolene to about the point indicated in Figure 1, and the level of fluid is kept supplied by the fuel input line (18) from the pump (3) through the dome or cover (15). A float (19) works between the edges of lower flange (14) of the shell (12) and follows the level of gasolene in the tank (7). This float has a stem (20) engaged by a transverse lever arm (21) at its upper end. The lever arm is pivoted to a hanger (22) carried by the cover or dome and engages a check valve (23) in the valve housing (24) in the fuel inlet connection (25) of the input line (18) so that when the gasolene level rises above the normal the valve (23) is closed to normally prevent further intake of gasolene from the storage tank. The casing or shell (12) has mounted therein a series of spaced fine mesh screens (26) carried in frames (27) and supporting a central float guiding tube (28) through which the stem (20) extends, and above the screens are a plurality of openings (29) in the shell. A vapor line (30) extends from the dome or cover (15) to the air cleaner (6) so that vapor is discharged to the carburetor at the same time liquid fuel is supplied to the bowl of the carburetor. Vents (12a) are provided in the shell (12) above the second and bottom screen to permit escape of vapor.

The operation of my invention is as follows:—

The fuel pump (3)—or diaphragm type of pump—draws the liquid fuel through line (2) from the storage tank (1) and forces same through input fuel line (18) to the compensator tank (7) whence it passes through check valve (24) to the shell or casing (12) and down through the screens (26) to the body of liquid in the tank (7). When the predetermined liquid level is reached the float (19), operates through stem (20) and lever arm (21) to close check valve (24), in which case back pressure is built up in the fuel line (18) which causes the devices that are dependable for operation upon back pressure or compression in the fuel pump to stop the same and discontinue the pumping of fuel. The pumping of fuel is thereby discontinued until the check valve is again opened by fall of the level of liquid in the tank (7). Valve (24) is again opened when the liquid level falls because of delivery of fuel through the gravity line (8) to the carburetor bowl (9). When the heat conditions of the engine, pump and feed lines is sufficient to cause the elements within the gasolene to expand there are four ways in which the pressure is dissipated;—

A. Between the storage tank and first inlet valve in the pump—the blow-off or relief being dissipated back through the storage tank (1).

B. Between the inlet valve of the pump (3) through the fuel line (18) to and through the valve (24) of the tank (7).

C. Between the tank (7) and carburetor float check valve, in which case the fuel line (8) relieves its pressure through blow-off into the bottom of the tank (7).

D. Through the vapor line (30) to the air intake tube of the carburetor.

Rapidly vaporizing fuel, which may be an inherent quality of the fuel itself due to its chemical components and when highly aerated due to sloshing in the storage tank, and when mixed with air and vapor due to the pump, and valve action and coming in contact with heat during its delivery from the storage tank to the carburetor, is restored to its solid form, de-aerated, and the vapor or "dry gas" is drawn off through vapor line (30) and used within the engine for combustion purposes through the air filter or cleaner (6), along with the liquid fuel passing by gravity through line (8) to the bowl (9) of the carburetor, where it is atomized in the usual manner and mixed with the air taken in through cleaner (6) and which already contains a certain amount of "dry gas". De-aeration is obtained, mainly, by screening through the three screens (26). When gasolene or any rapidly vaporizing fuel falls from valve (24) on the screens (26), which are preferably of 200 mesh, the large vapor and air bubbles are broken up into gas and vapor, or air or oxygen, and rise to the dome of the tank to the vapor line (30). The liquid de-aerated fuel passes through screens (26), is further vaporized through natural settlement, and this "dry gas" or air or any form of vapor rises on outside of screen shell and passes through openings (29)—as shown by the arrows, and finally passes to vapor line (30). In case the screens become clogged with any dirt and the like fluid will rise from the upper screen and flow out through openings (29) and down into the tank (7) and a percentage of vapor will still continue to pass through line (30). Vapor, "dry gas" oxygen, or air flows through the vapor line (30) through slight pressure created by expansion when coming in contact with heat from the engine, and the direction of relief of pressures, after passing through the first check valve of the pump (3) is always toward the tank (7); the conductors of the fuel, such for instance as lines (18); (30) and (8) are usually in proximity with heat. By reason of the relief of pressures fuel lines can even be located on the hottest parts of the engine, or in close proximity therewith, without interference with perfect fuel feeding. The outlet of the vapor line (30) is located near the center of the air cleaner (6) so that the intake of air will form a vortex or lowered air pressure tending to pull fuel through the vapor line. In operation the vapor or "dry gas" that is fed into the air intake through line (30) takes up additional atomized fuel from the carburetor. The throttle valve of the air intake controls the allowable input of air and "dry gas", and as the "dry gas" is more volatile than wet or partly atomized liquid, the throttle valve does not have to be opened as wide as normally when there is no "dry gas" being fed into the air intake; consequently atomizing jets and feed devices do not open as wide as when the compensator is in operation, and the faster the engine speed the quicker is the movement of fuel through the feed lines from the storage tank, and the greater the amount of vapor generated and fed through line (30) to the carburetor. By the same token the more "dry gas" being generated and fed through line (30) to the carburetor, the higher is the fuel efficiency, which explains the great saving by my device in fuel consumption per mile of vehicle travel. Furthermore aeration of fuel or gasolene by sloshing in the storage tank, due to movement of the body of the car over rough roads and the like, which has heretofore been a source of disturbance in the smooth operation of the engine due to irregular passage of air through the carburating devices is eliminated. For instance, when the storage tank is half-empty or less, the gasolene is more highly aerated, and adjustments of the carburetor were likely made when fuel was in a de-aerated condition in the fuel tank. Since it is not feasible to readjust the carburetor for the aerated condition of the fuel in the storage tank the efficiency of the fuel has heretofore been decreased and rendered variable. My present device eliminates this variable by causing the carburetor proper at all times to act upon de-aerated liquid fuel in accordance with the original setting of the carburetor, and at the same time utilizing the vapor and "dry gas" content by injecting the same into the resulting combustible charge through the air intake of the engine. A great saving of fuel is thereby effected, and variations in fuel efficiency eliminated.

While I have described my invention in great detail in the foregoing certain changes may be made in the form and arrangement of parts without departing from the spirit of the invention, and it is again emphasized that determination of the scope of my invention should only be conclusive when made in the light of the subjoined claims.

I claim:—

1. The combination with the fuel storage tank, fuel pump, air intake and carburetor of an internal combustion engine; an auxiliary tank for fuel connected with the fuel pump and with the carburetor whereby to receive fuel from the storage tank by force feeding from the pump and dispense liquid fuel by gravity feed to the carburetor, a float controlled valve device for maintaining the level of liquid fuel in the auxiliary tank a vaporous fuel receptacle within the auxiliary tank, and said receptacle having a connection to the air intake of the carburetor for delivering vaporous fuel thereto for incorporation in the combustible charge.

2. The combination with the fuel storage tank, fuel pump, air intake and air cleaner, and carburetor of an internal combustion engine; an auxiliary tank for fuel having an input delivery pipe to the fuel pump, and an output fuel pipe to the carburetor whereby said tank receives its supply of fuel by force feeding from the pump and dispenses its contents by gravity feed to the carburetor, a shell within the tank, a series of reticulated members in the shell, and a float controlled valve device for maintaining the level of liquid fuel in the auxiliary tank, said input line to the tank delivering to the shell whereby the liquid fuel is deaerated by passage through the reticulated members, and a vapor line from the tank to the air intake and cleaner for delivering vaporous fuel thereto for incorporation in the combustible charge.

3. Means for eliminating back pressure in the fueling system of an internal combustion engine, comprising an auxiliary tank interpolated in the line between the fuel pump and the carburetor whereby to receive the fuel under force feed from the pump and deliver the fuel under gravity feed to the carburetor a chamber within the auxiliary tank for receiving vaporous fuel, and a relief and vapor delivery line from the chamber to the air intake and cleaner of the carburetor.

4. Means for eliminating back pressures and variations in fuel feeding in an internal combustion engine of the type having a force feed system, comprising an auxiliary fuel tank interpolated in the fuel line from the fuel pump to the carburetor thereby to receive fuel from the pump by force feeding and deliver said fuel to the carburetor by gravity feeding, a shell within the tank through which the fuel passes and provided with means for inducing deaeration of the liquid fuel, said shell serving as a receptacle for vaporous fuel and a vapor line from the shell to the air intake and cleaner of the carburetor for delivering vaporous fuel thereto for incorporation in the combustible charge and for relieving pressure within the tank.

5. Means for preventing vapor lock and compensating for back pressures and fuel expansion variables in a fuel feeding system for internal combustion engines of the type having a force feed system, comprising an auxiliary tank interpolated in the fuel line from the fuel pump to the carburetor whereby the fuel is delivered to said tank by force feeding and delivered from the auxiliary tank to the carburetor by gravity feed, a shell within the auxiliary tank, a float controlled valve device in the auxiliary tank and extending into the shell for maintaining a predetermined level of liquid fuel therein, and a vapor line from the shell to the carburetor for delivering vaporous fuel to the carburetor through the air intake and cleaner for incorporation in the combustible charge and for relieving pressures generated in the auxiliary tank.

6. A fueling system for internal combustion engines; comprising a storage tank, an auxiliary fuel tank, a pump for delivering fuel from the storage tank to the auxiliary tank, a carburetor, said auxiliary tank connected with the carburetor for delivering liquid fuel by gravity to the carburetor, a shell within the auxiliary tank and a vapor line from the shell to the air intake of an internal combustion engine whereby to deliver vapor, air and "dry gas" for incorporation in the combustible charge.

7. The combination in the fueling system and charge forming devices of an internal combustion engine of the type utilizing force feeding; an auxiliary fuel tank interpolated in the fuel line between the fuel pump and the carburetor, a shell within the auxiliary tank, a plurality of spaced screen carried by the shell through which the liquid fuel is passed, a float controlled valve in the auxiliary tank for regulating the admission of fuel thereto from the pump in accordance with a predetermined level in the auxiliary tank, openings in the shell for escape of vapor and gas, a vapor line from the auxiliary tank to the air intake and cleaner of the carburetor whereby to relieve pressures in the fueling system and utilize such vapors in the combustible charge, and a fuel line from the auxiliary tank to the bowl of the carburetor whereby to feed the liquid fuel from the auxiliary tank to the carburetor by gravity.

8. In an internal combustion engine fueling and charge forming system of the type having a fuel pump; means for relieving back pressures and preventing vapor lock comprising an auxiliary tank interpolated in the fuel line between the pump and the carburetor and receiving the fuel from the pump and delivering the fuel from the tank to the carburetor by gravity feed, a vapor accumulating receptacle within the auxiliary tank and a vapor line connected with said receptacle and with the air intake to the carburetor for relieving pressures in the system and delivering accumulated vapor and the like to the air intake and cleaner for incorporation in the combustible charge.

9. The combination in the fueling system and charge forming devices of an internal combustion engine of the type utilizing force feeding; a unitary device interpolated in the fuel line and having connections with the fuel pump, the carburetor, and the air intake to the carburetor so that liquid fuel is pumped into said device at the top thereof and fed out by gravity from the bottom of said device to the carburetor; said device having a liquid fuel receiving chamber, a member forming a compartment within the liquid fuel receiving chamber and spaced from the walls thereof, said fuel intake leading into said compartment, and the connection to the carburetor air intake leading from said compartment whereby to conduct vaporous fuels from said compartment to said air intake.

10. The combination in the fueling system and charge forming devices of an internal combustion engine of the type utilizing force feeding; a unitary device interpolated in the fuel line and having connections with the fuel pump, the carburetor, and the air intake to the carburetor so that the liquid fuel is pumped into said device at the top thereof and fed out from the bottom of said device by gravity to the carburetor; said device having a liquid fuel receiving chamber, a liquid level float operated control valve for the fuel intake, a member forming a compartment within the liquid fuel receiving chamber and spaced from the walls thereof; said compartment receiving vaporous fuel, said fuel intake leading into said chamber, screen devices in said member for deaerating the liquid fuel, and the connection to the carburetor air intake leading from said chamber whereby to conduct vaporous fuel from said chamber to the air intake of the carburetor.

LUTHER W. SYKES.